US006645075B1

(12) United States Patent
Gatto et al.

(10) Patent No.: US 6,645,075 B1
(45) Date of Patent: Nov. 11, 2003

(54) CASHLESS TIME GAMING

(75) Inventors: Jean-Marie Gatto, London (GB); Thierry Brunet De Courssou, Palo Alto, CA (US); Pierre-Jean Beney, London (GB)

(73) Assignee: Cyberscan Technology, Inc., Palo Alto, CA (US)

( * ) Notice: Subject to any disclaimer, the term of this patent is extended or adjusted under 35 U.S.C. 154(b) by 4 days.

(21) Appl. No.: 10/167,052

(22) Filed: Jun. 10, 2002

(51) Int. Cl.$^7$ .......................... A63F 13/00; A63F 9/24; G06F 17/00; G06F 19/00

(52) U.S. Cl. ............................ 463/25; 463/16; 463/26; 463/27

(58) Field of Search ................................ 463/1, 16–27, 463/40–42; 273/143 R, 138.2

(56) References Cited

U.S. PATENT DOCUMENTS 5,354,202 A * 10/1994 Moncrief et al. ............. 434/69
5,743,523 A * 4/1998 Kelly et al. .............. 273/138.1
5,816,913 A * 10/1998 Nakamura ..................... 463/6
5,910,046 A * 6/1999 Wada et al. .................... 463/6
6,171,186 B1 * 1/2001 Kurosawa et al. ............ 463/31
6,425,823 B1 * 7/2002 Byrne ......................... 463/16

* cited by examiner

*Primary Examiner*—Teresa Walberg
*Assistant Examiner*—Robert Mendoza
(74) *Attorney, Agent, or Firm*—Young Law Firm, P.C.

(57) ABSTRACT

A player in a casino may purchase an amount of playing time and then play as quickly as he likes on gaming machines during that period of time. The player may try his luck against a frantic rhythm with minimum return on each game or at a slower-pace rhythm with a higher return on each game. When the player actuates a cash-out signal, the time clock is frozen; the player may then choose to continue playing on another machine or return to the same machine at any other time. The game outcome is adjusted in accordance with the speed at which the game is played. The games may also be automatically triggered following a manual arming by the player. When the rhythm is slow, standby time may be used to entertain the player.

47 Claims, 10 Drawing Sheets

Game Session

700

CASHLESS TIME GAMING

BACKGROUND OF THE INVENTION

1. Field of the Invention

This invention relates generally to the field of electronic gaming terminals available in casinos and other legal places.

2. Description of the Related Art

Electronic gaming machines available in casinos and other legal places are games of chance whereby the player repetitively tries his luck to win prizes. The player purchases an amount of credit to play by transferring monetary value into the gaming machine or into the networked gaming system using coins, banknotes, vouchers or any other form of financial instrument. In exchange for his money, the player is given an electronic credit on a local gaming machine or alternatively on a networked gaming system by way of a player account managed on a server. Each time the player plays a game, his credit balance is debited of the amount he wishes to wager. Depending on the local game regulation, the wager amount is either hardwired into the gaming machine or selectable by the user prior to playing a game. The play-and-debit scenario is typically repeated monotonously until the player's credit is used up or until a prize is won. The prize value is derived from numbers drawn randomly, an outcome prize matrix and the wager amount.

SUMMARY OF THE INVENTION

It is the object of this invention to offer the players a more interesting play pace whereby the rhythm of the game play may be varied and the prize outcome adjusted accordingly. The player may try his luck against a frantic rhythm with minimum return for each game or at a slow-pace rhythm with higher return on each game. Standby time may be used to entertain the player.

A player may purchase an amount of playing time and then play as quickly as he desires on gaming terminals during that period. When the player actuates the cash-out, the down counting time clock is frozen. The player may then choose to continue playing on another machine or return to the same machine at any other time. The game outcome is automatically adjusted in accordance with the speed at which the game is played.

It is a further object of this invention to offer the players a synchronized game playing rhythm whereby the instant at which the game is activated is triggered by some form of psychedelic or ambiance input such as music tempo, microphone input tempo and video tempo. The games may be automatically triggered following a manual arming activated by the player. This feature will be appreciated by players who like to try their luck while being immersed in a particular ambiance or subsequent to the occurrence of a given event such as when a bird dropping has fallen on them, when a car accident occurs in front of them, when being in a special place or when a blond girl smiles at them, for example.

Standby time may be used to entertain the player, and the entertainment may drive the automatic triggering of games.

It is a further object of this invention to support all forms of cashless instruments such as:

- a player account whereby the time-to-play balance and the total of the winnings are associated to a patron ID;
- an anonymous game session account whereby the time-to-play balance and the total of the winnings are associated to a game session ID;

- a voucher verification account whereby the time-to-play balance, the total of the winnings and the hash or encrypted signature generated when the voucher is created are printed or encoded on the voucher;
- a smartcard reconciliation account whereby the, time-to-play balance and the total of the winnings are mirrored copies of the time-to-play balance and the total of the winnings managed in the secure electronic module of the smartcard.

DETAILED DESCRIPTION OF THE INVENTION

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

Figure 1:
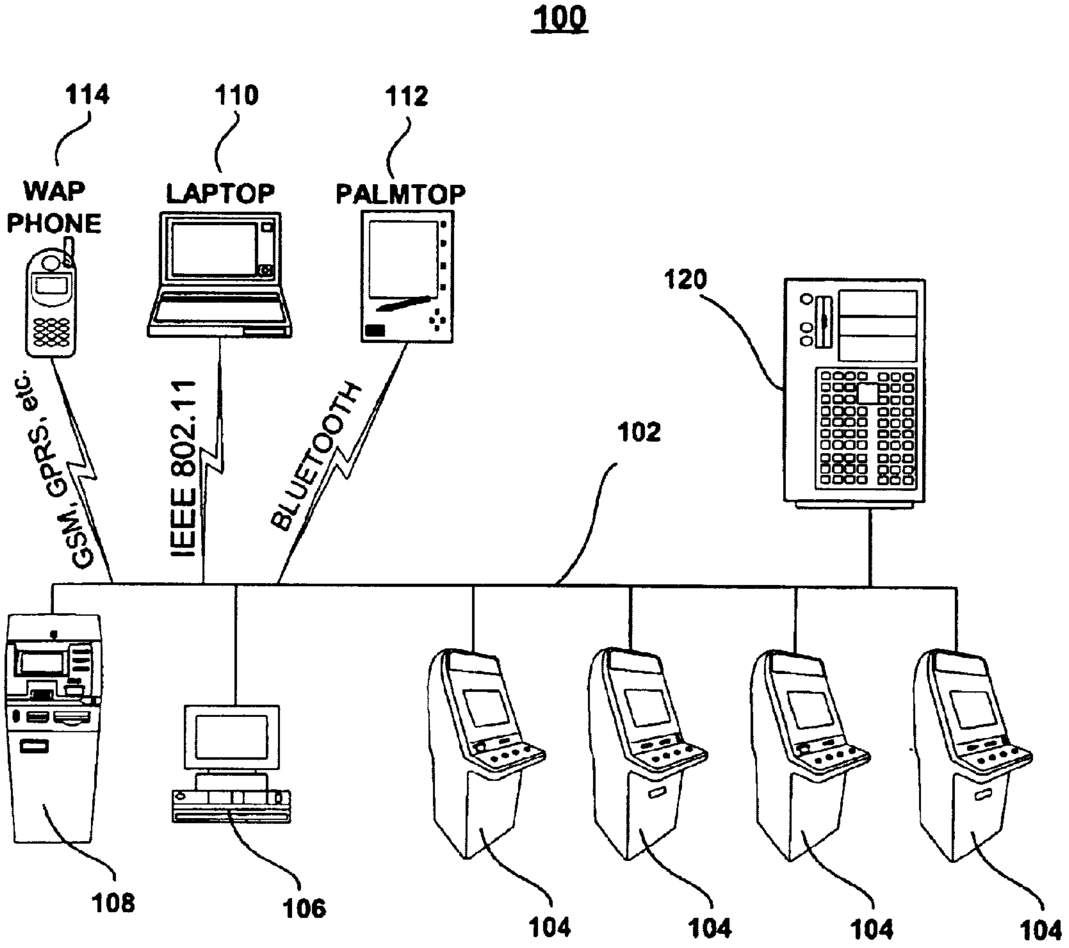
FIG. 1 is an overview diagram of an exemplary cashless gaming system, in accordance with an embodiment of the present invention.

FIG. 1 illustrates a gaming system 100 according to an embodiment of the present invention. The system may comprise a plurality of gaming terminals 104, a cashier terminal 106 or an automatic cashier 108, a central system 120, all communicating via a wired or wireless network 102. Wireless entry devices such as laptops 110 using 802.11, palmtops 112 using Bluetooth or 802.11, or WAP phones may advantageously be used in some premises for operators to consult and credit the game session meters.

The gaming terminals may be of the traditional cash-in type comprising coins and/or notes acceptors and coins and/or notes dispensers, or alternatively, may be of the cashless type.

Figure 2:
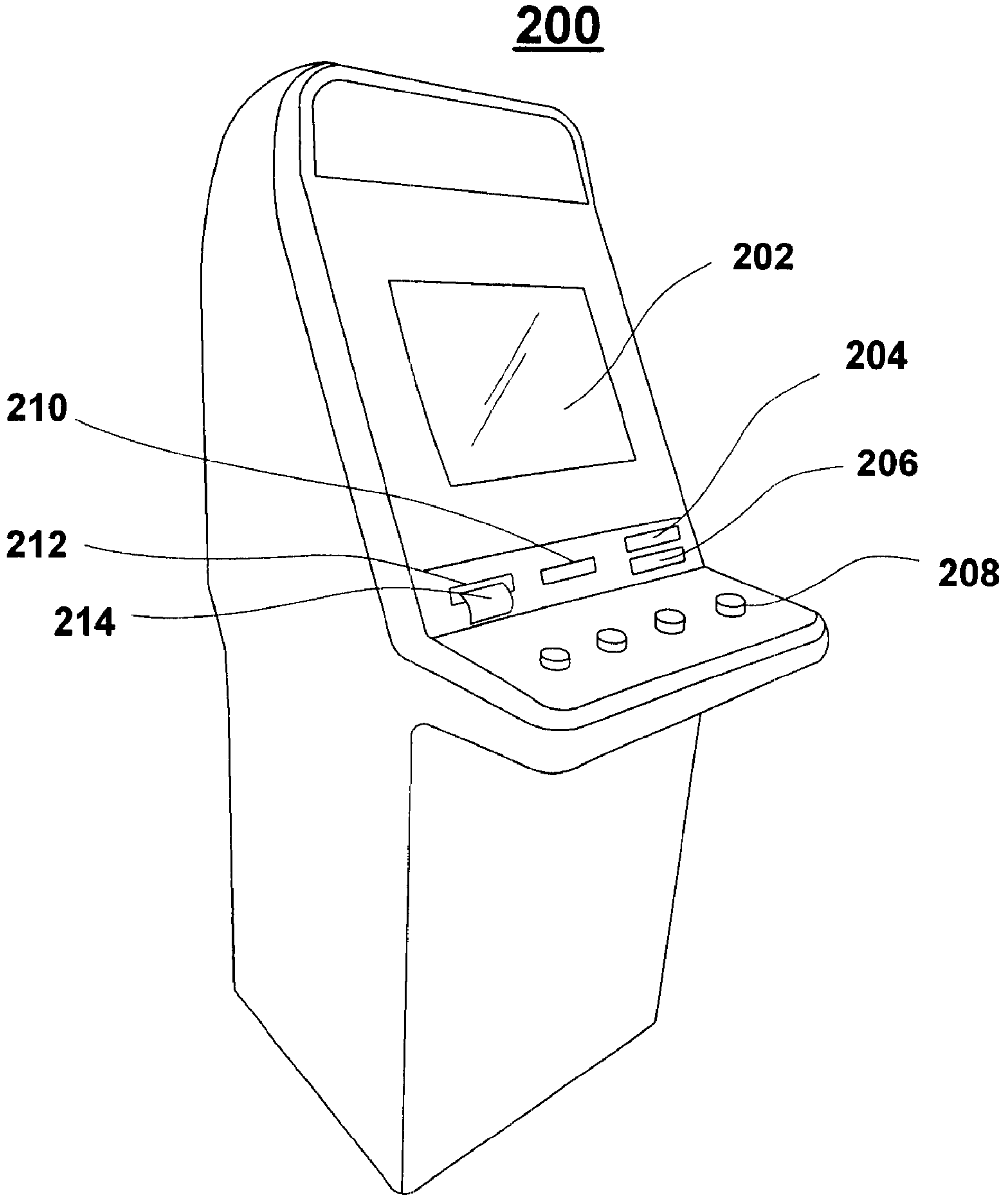
FIG. 2 is a view depicting an exemplary cashless game terminal in accordance with an embodiment of the present invention.

FIG. 2 illustrates an exemplary cashless gaming machine 200 that does not accept or redeem cash. It is to be understood that the gaming machine 200 is but one possible implementation of such a cashless gaming machine and that the present invention is not limited thereto. For cashless operation, the gaming terminal is equipped with means of capturing the encoded information associated with a cashless instrument submitted. The cashless instrument may be a physical portable instrument such as: a paper voucher comprising printed codes; a strong paper ticket comprising printed codes and encoded magnetic codes; a rigid ID card comprising printed codes, magnetic codes or optical codes; a secure contact or contact-less electronic ID device comprising sophisticated electronic (a smart card or a smart USB dongle); or alternatively, a user ID and password to be typed or spoken, or alternatively again advanced biometric features (finger print, voice recognition, face recognition). The information captured from a cashless instrument is processed in order to derive a pointer to a location containing the necessary computer data to identify and validate the cashless instrument. The information captured from a cashless instrument may contain an encrypted signature (or hash) to ensure that the information has not been maliciously modified. The cashless instrument allows to derive a valid "identifier code" that is used by the software to execute the appropriate transactions to emulate the use of real cash for the cashless instrument submitted. The cashless instrument is thus denoted "ID instrument" hereafter. The ID instrument may be capable of storing additional information when accessed by a device, or alternatively be replaced by a new one (i.e. a newly printed ticket). The gaming machine ID device(s) accepting the ID instrument submitted may include a magnetic card reader 204, a SmartCard reader and writer 206, a barcode reader 210, a ticket printer 212, a biometric reader (finger print, voice identification, head identification, etc.), a touch-screen 202, keyboard or keypad to enable players to enter a PIN (Personal Identification Number). The gaming machine identification device(s) may further include an ID token reader to read other forms of advanced ID devices such as ID buttons, USB ID dongles, ID key-chains (such as disclosed, for example in commonly assigned US design patent entitled "Personal Communicator and Secure ID Device" patent number D441,765 issued on May 8, 2001) as well as secure communication means for securely communicating with, for example, personal wallets, hand held PCs or computer wrist-watch via infra red, magnetic field, capacitive charges or RF (Bluetooth, IEEE 802.11, etc.) for player identification purposes. A printer 212 may print bar-coded tickets 214 that can be read by a barcode reader 210.

Figure 3:
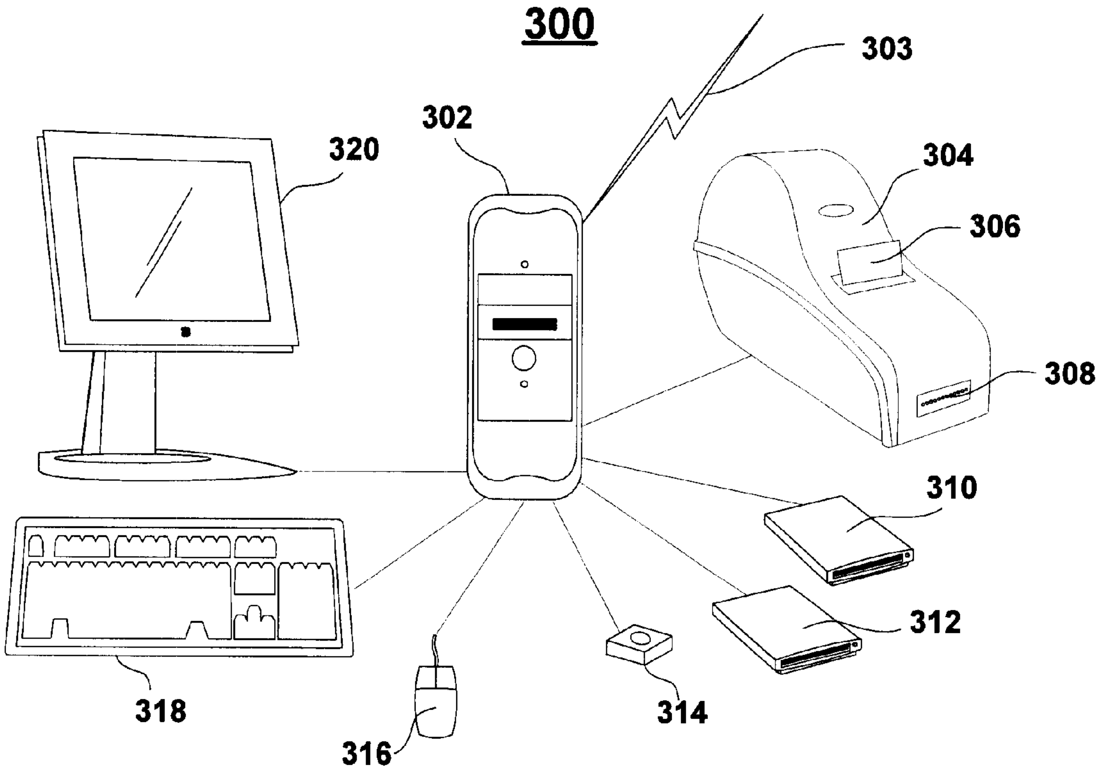
FIG. 3 is a view depicting an exemplary cashier terminal in accordance with an embodiment of the present invention.

FIG. 3 illustrates a cashier terminal 300, according to an embodiment of the present invention. The terminal may include a computer 302 connected via wired or wireless link 303 to the network 102 and to a ticket printer 304. The ticket printer 304 may include an integrated printer for printing tickets or receipts 306 that include a human and/or machine readable code imprinted thereon and code reader 308 for reading the code(s) imprinted on the ticket 306. The cashier terminal may also include, for example, a magnetic card reader 310, a SmartCard reader 312, a biometric reader 314 (such as a fingerprint reader, for example), a display 320 and input devices such as a keyboard 318 and/or a mouse 316. The cashier terminal is controlled by an operating system capable of secure network communication such as Microsoft Windows, embedded XP or Linux, for example.

Figure 4:
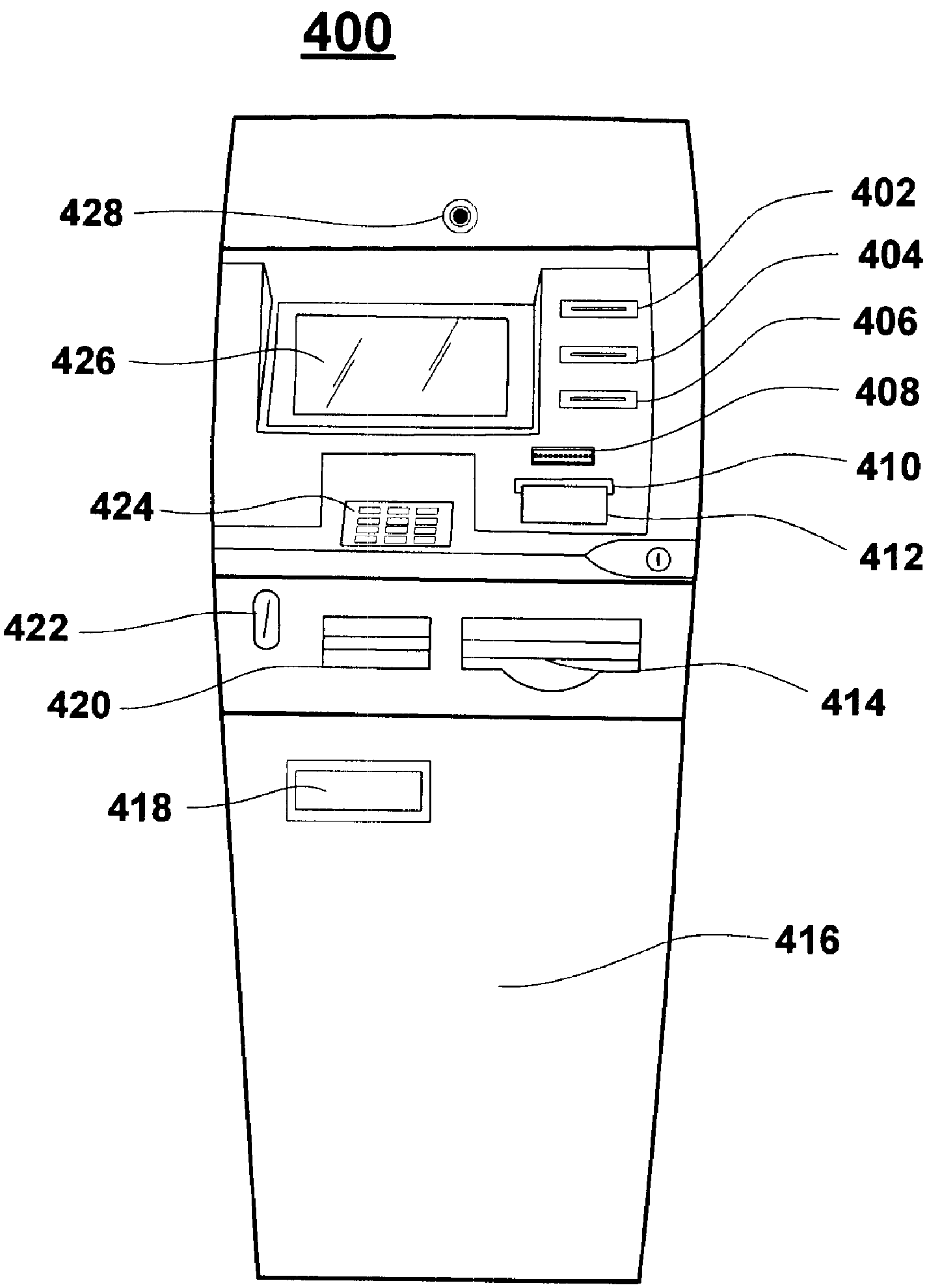
FIG. 4 is a view depicting an exemplary automated cashier in accordance with an embodiment of the present invention.

FIG. 4 illustrates an embodiment of an automated cashier 400, which dispenses with the need for a human cashier. The automated cashier 400 may include an internal computer connected to the network 102 with the gaming terminals 104, a coin acceptor 422, a note acceptor 420, a coin dispenser/hopper 418, a SmartCard or magnetic card dispenser 404, a note dispenser 414, a ticket printer 410 for printing a ticket 412, a magnetic card reader 402, a SmartCard reader/writer 406, a barcode reader 408, display with touch-screen 426, a keypad 424, a video camera 428 and/or a UL 291 certified cash safe 416, for example. The UL 291 certified cash safe 416 prevents robbery of the cash stored inside the automated cashier 400. The automated cashier 400 may further include biometric ID readers, ID token readers to read other forms of advanced ID devices such as ID buttons, USB ID dongle, ID key-chains, etc., as well as secure communications means for communicating with personal wallets, hand held PCs or computer wrist-watch via infra red, magnetic field, capacitive charges or RF (Bluetooth, IEEE 802.11, etc.) for identification purposes.

Figure 5:
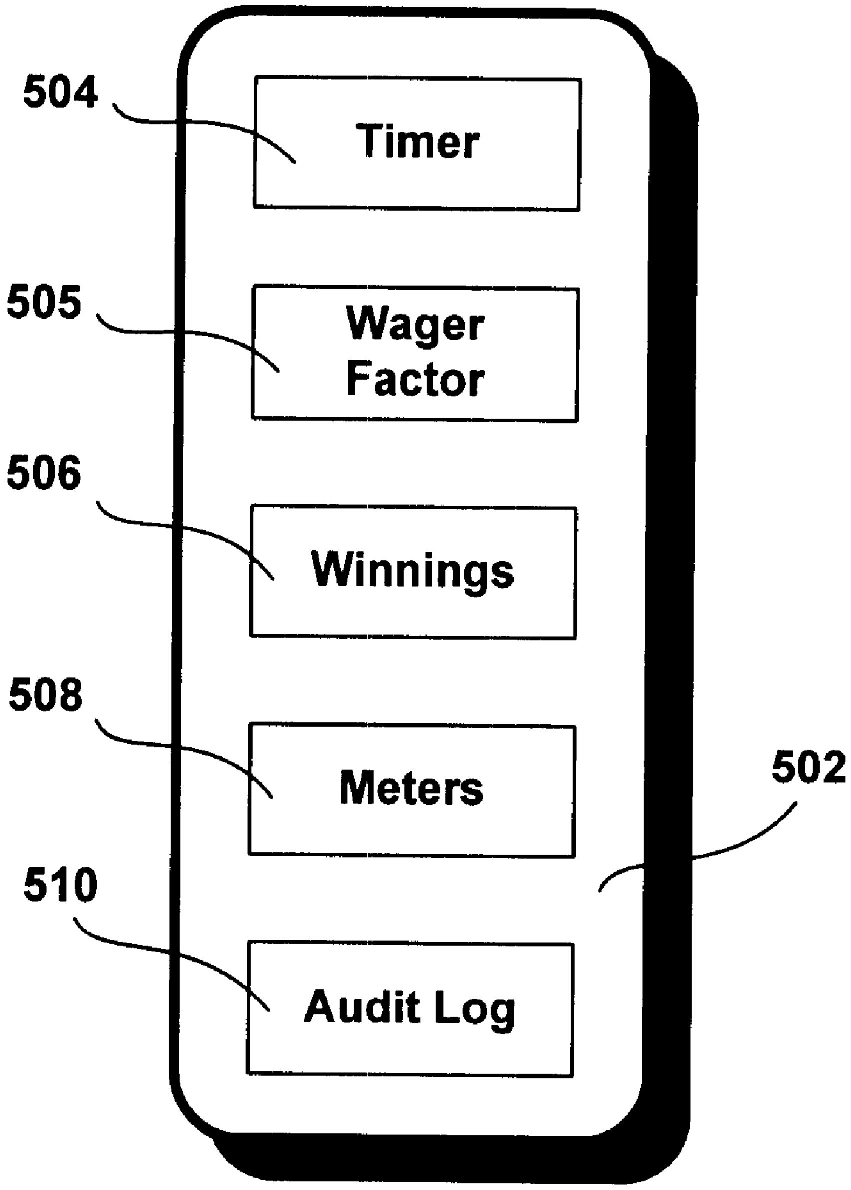
FIG. 5 is a diagram depicting the game session meters in accordance with an embodiment of the present invention.

In compliance with gaming jurisdictions, gaming terminals contain a set of highly secure persistent meters. FIG. 5 illustrates an embodiment of the meters 502 that control a gaming session comprising essentially the patron's game session timer 504, the wager factor 505, the patron's winnings 506, the meters 508 associated with a variety of events such as coins inserted and coins given out for a particular game, and an audit log 510 of events for later examination if required. The wager factor reflects the wager that is applied per unit of time; for example if the patron pays $100 for 2 hours of playtime, the wager factor is 100/2=$50 per hour or 100/(2*3600)=$0.0139 per second. Meters 508 and the audit log 510 are usually reserved for verification purposes by the game operator.

A preferred embodiment makes use of a down-counting timer that is exhausted (time-out) when reaching zero, but the same results may be achieved by making use of up-counting timers that are exhausted (time-out) when reaching a predetermined value.

Figure 6:
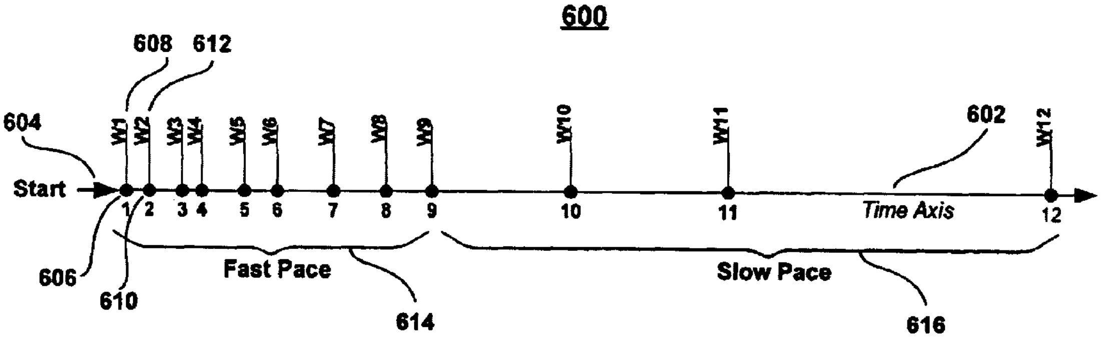
FIG. 6 is a diagram depicting the variable rate gaming during a game session in accordance with an embodiment of the present invention.

Upon initialization of a new game session, the timer is set to the playtime purchased by and the winnings are set to zero. As soon as the patron starts playing, the timer is decremented with a predetermined clock tic, 1/100th of a second for example, and the game session ends when the timer reaches zero. As illustrated in FIG. 6, the patron may play at a variable pace. In the preferred invention embodiment, the wager applied at each game played is variable and is dependent on the pace at which the patron plays. The wager taken into account for calculating the winning outcome at each play is related to the time elapsed since the previous play, also called intermission hereafter. The faster the pace 614, the lower are the wagers considered for calculating the winnings outcome in case of a win. Conversely, the slower the pace 616, the higher are the wagers considered for calculating the winning outcome in case of a win.

As shown in FIG. 6, a game session 600 may start 604 when for example the patron triggers the play button for the first time 606. The wager W1 608 associated with the first play 606 may be a predetermined amount, $0.10 for example. Subsequent play triggers are plotted on the time axis is 602. The wager W2 612 associated with the second play 610 that occurs 2.76 seconds after first the play 606 may be $0.23; wager W3 for third play that occurred 3.84 seconds after the second play 610 may be $0.32. Table 1 hereunder shows the wagers applied for each of the games played of FIG. 6, and until the session ends after 2 hours of playtime purchased for $100.

TABLE 1

| Play # | Intermission (sec) | Wager (in $) |
|---|---|---|
| 1 | — | 0.10 |
| 2 | 2.76 | 0.23 |
| 3 | 3.84 | 0.32 |
| 4 | 1.68 | 0.14 |
| 5 | 3.84 | 0.32 |
| 6 | 4.08 | 0.34 |
| 7 | 5.04 | 0.42 |
| 8 | 5.64 | 0.47 |
| 9 | 5.16 | 0.43 |
| 10 | 14.52 | 1.21 |
| 11 | 16.44 | 1.37 |
| 12 | 32.52 | 2.71 |
| . . . | . . . | . . . |
| Last | 5.04 | 0.42 |
| TOTAL | 2 Hours | 100.00 |

In a preferred embodiment, in case of a win, the interval of time between the last play and the previous play (the intermission) is taken into account as a multiplier when the winnings are credited. For example, for the same matching symbols, if the intermission is 5 seconds the winning amount credited is $100; if the intermission is 15 seconds the winning amount credited is $300.

Figure 7:
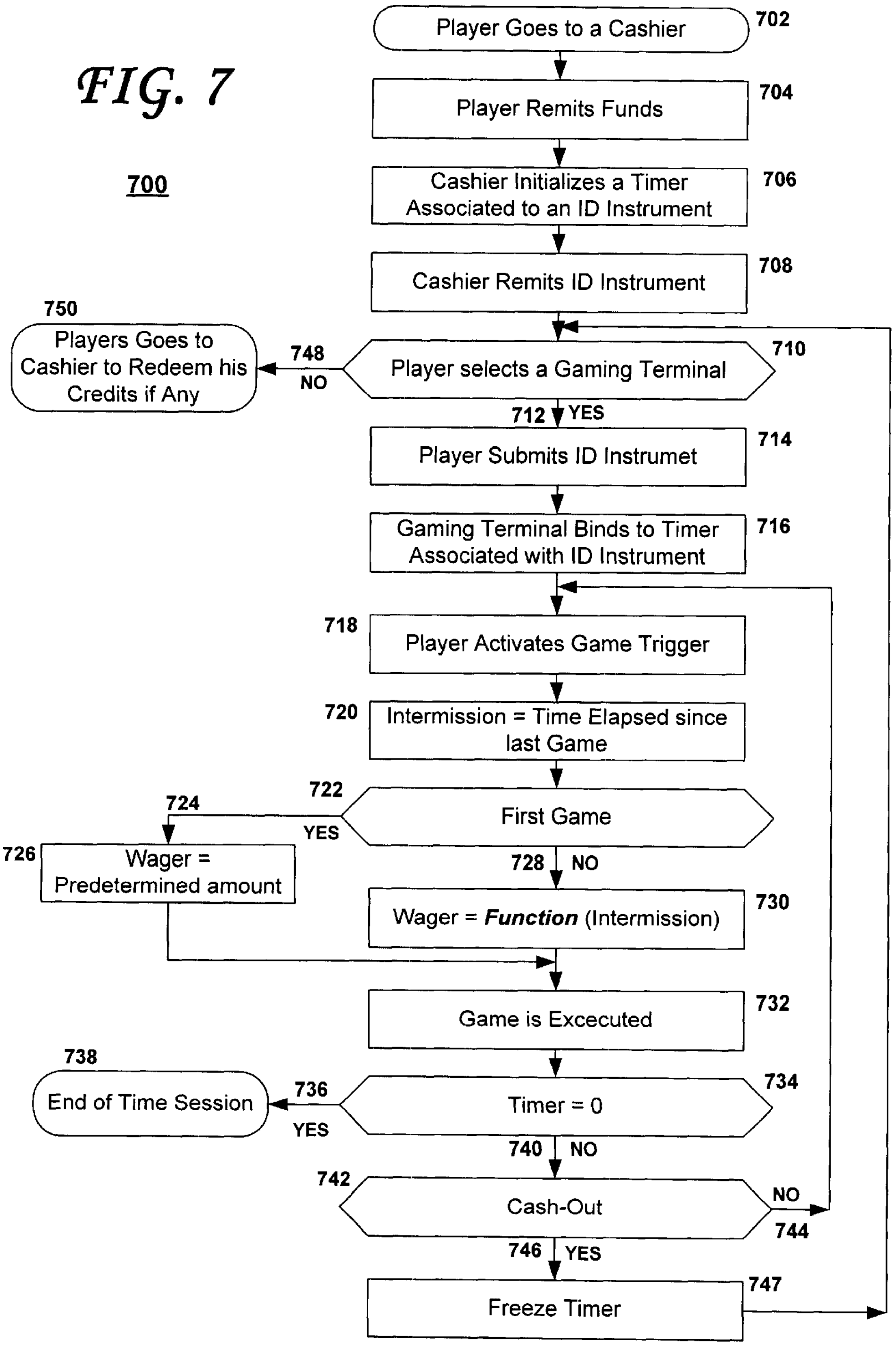
FIG. 7 is a flow diagram detailing a cashless time game session in accordance with an embodiment of the present invention.

FIG. 7 illustrates a cashless time game session in accordance with an embodiment of the present invention. The player goes to a cashier 702 and remits 704 for example $100 to play for 2 hours. Using a terminal 300, the cashier sets some parameters associated with an ID instrument 706 that he remits to the patron 708. The parameters are essentially: Instrument ID=X1Y2Z3, Timer=2 hours or 120*60=7200.00 seconds, amount=$100. The parameters are accessible by any gaming terminal on which the patron may play.

The patron then selects a gaming terminal at 710 and submits its ID instrument at 714. As shown at 716, the gaming terminal binds to a timer that is initialized with the parameters associated with the ID instrument. The timer may be located on the local gaming terminal or on a computer system accessible via the network. In this example, the timer is set to the value 720,000 assuming a tic timer of 1/100th of a second and the wager factor is set to 100/720000=$0.000139 per 1/100th of a second of intermission. Each time the patron triggers a new game 718, the intermission is captured, as shown at 720. In a preferred embodiment of this invention, the wager taken into account for the computation of the outcome in case of a winning at the first game 722. If this is the player's first game (YES branch 724), the wager is a predetermined amount 726, as shown at 726. If this is not the player's first game (NO branch 728), the wager taken into account for the computation of the outcome in case of a winning is a function of the intermission, as shown at 730. The game is executed at 732 and in case of a win, the prize money is credited to a winning account associated with the ID instrument. After a game completion, the game session is ended as shown at 738, if the timer 734 has timed-out as indicated at 736. If the timer has not timed-out (NO branch 740) and the patron wishes to continue to play (does not wish to cash out), the patron may continue to play, as indicated by the NO branch 744. If the patron, however, activates the cash-out signal 742, the method proceeds to 746, whereupon the timer is frozen at 747. The player may select another gaming machine 710 to play or, as shown at 748, may go to the cashier to redeem his winnings and unused time 750.

In a preferred embodiment, the wager variation together with the associated changing prize return while the time elapsed since last game increases, may be dynamically displayed to the patron.

In another preferred embodiment of the present invention, an automated cashier 400 is used by the patron instead of going to a cashier.

In yet another preferred embodiment of the present invention, the gaming terminals are equipped with coins and/or note acceptors and an amount of time to play is purchased directly on the gaming terminal by inserting the corresponding money amount. Any prize money won is paid-out immediately by the coin/note dispenser without interrupting the time game session. Alternatively, prize money is credited without interrupting the time game until timer times-out or the cash-out signal is activated.

In yet another preferred embodiment of the present invention, the patron may use prepaid card such as smart cards or magnetic card with a secret number to be revealed when scratching. The patron may also use prepaid vouchers comprising machine readable printed codes and optionally verification numbers to be keyed-in.

The time gaming method object of the present invention is suitable for supporting all forms of cashless instruments such as:

a player account;

an anonymous game session account;

a voucher verification account;

a smartcard reconciliation account.

A cashless player account is identified by a unique identifier key assigned to a patron that points to a set of records stored in computer memory containing the patron's personal details and the state of the cashless session. The records may be queried and updated by authorized software using the key, which may be derived from the ID instrument submitted. The state of the cashless session comprises essentially the balance of time-to-play and the total of winnings available to the patron and some auxiliary attributes reflecting the games played, the time stamping of various operations and a flag indicating if available credits have already been paid.

An anonymous game session account is identified by a unique identifier key assigned to a game session that points to a set of records stored in computer memory containing the state of the cashless session. The records may be queried and updated by authorized software using the key that may be derived from the ID instrument submitted. The state of the cashless session comprises essentially the balance of time-to-plat and the total of winnings available to the anonymous older of the ID instrument and some auxiliary attributes reflecting the games played, the time stamping of various operations and a flag indicating if available credits have already been paid.

A voucher verification account is identified by a unique identifier key assigned to a voucher that points to a set of records stored in computer memory containing the state of the cashless session. The records may be queried and updated by authorized software using the key, which may be derived from the voucher submitted. The state of the cashless session comprises essentially the balance of time-to-play and the total of winnings available to the holder of the voucher and verification data, and some auxiliary attributes reflecting the games played, the time stamping of various operations and a flag indicating if available credits have already been paid. In the case of a cash-out at the gaming terminal or alternatively when funds are remitted to a human cashier or an automated cashier, a voucher comprising clear text and machine-readable code representing the monetary value of the credit available and some verification data is dispensed. The clear text may indicate the value of the credit of time-to-play available, or simply said for the holder, "the value of voucher". In the case of a cash-in at the gaming terminal or alternatively when requesting the redeem of the winnings to a human cashier or an automated cashier, a voucher comprising clear text and machine-readable code representing the monetary value of the winnings available and some verification data is read. The unique identifier key is derived from the verification data upon reading the clear text and/or the machine-readable code. The associated records are then queried in order to authenticate the value of the voucher by comparing the verification data contained in the records with the verification data read from the voucher. It should be apparent to those acquainted with secure transactional techniques that the unique identifier key, or alternatively the verification data, may be a hash or an encrypted signature of all or portion of the clear text and/or the machine-readable code.

A smartcard reconciliation account is identified by a unique identifier key assigned to a smartcard that points to a set of records stored in computer memory. The records therefor are a "slave" mirrored copy of same records containing the state of the cashless session that are maintained in the electronic circuits of the smartcard. The smartcard maintains the "master" copy of the records. The slaved mirrored records may be queried but not updated by authorized software using the key that may be derived from the smartcard submitted. The state of the cashless session comprises essentially the balance of time-to-play and total of winnings available to the holder of the smartcard and some auxiliary attributes reflecting the games played, the time stamping of various operations and a flag indicating if available credits have already been paid. The slaved mirrored records are used to reconcile accounting when the smartcard is used in order to detect possible forgery. Alternatively, the slaved mirrored records are used as a backup repository to pay the holder of the smartcard in case of the failure of the smartcard. When used for backup, the "slave" records may be updated by authorized software using the key that may be derived from the smartcard submitted (embossed code for example).

The ID instrument used to derive the unique identifier key may be submitted in a variety of ways such as typing a user ID and password, keying-in a code on a keypad, presenting a bar-coded voucher, an encoded card, a secure electronic ID device or recognizing biometric features.

The unique identifier keys are commonly called GUI or global unique identifier.

Figure 8:
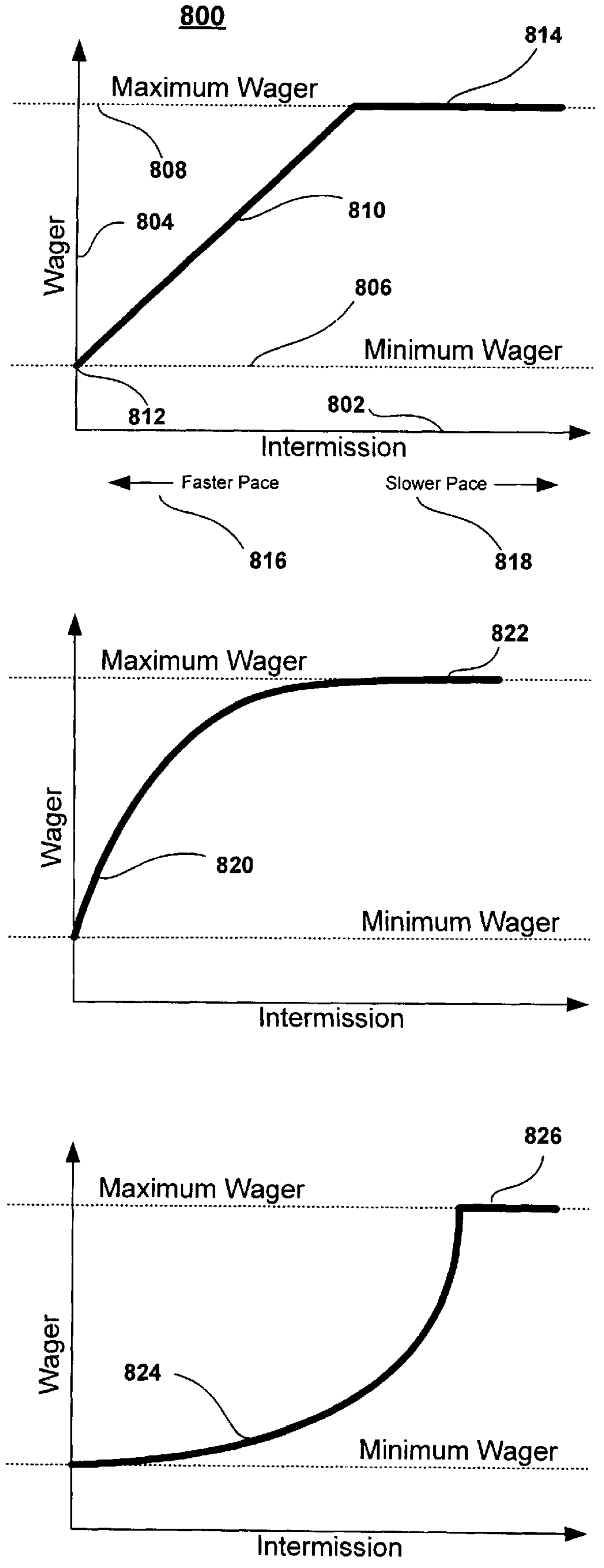
FIG. 8 is a diagram depicting various applicable time-function wager profiles in accordance with an embodiment of the present invention.

Various profiles 800 may be available for implementing the wager function, as shown in FIG. 8. For example, a linear function 810 may be chosen between a minimum wager 806 and a maximum wager 808, with a minimum wager amount 812 for the shortest intermission, and a maximum wager amount 814 when intermission exceeds a predetermined amount. Alternatively, an aggressive sensitivity to intermission acceleration 820 may be chosen which rapidly reaches the highest wager amounts 822 for the shortest intermissions. Alternatively yet, a soft sensitivity to intermission acceleration 824 may be chosen which reaches the highest wager amounts towards the largest intermissions.

In a preferred embodiment of the present invention, a prize matrix such as the exemplary matrix shown in table 2 may be simply constructed in which the prize money is proportional to the intermission.

TABLE 2

Prize matrix

| | Winnings US$ for X seconds Intermission | | | | | |
|---|---|---|---|---|---|---|
| Draw | 1 (reference) | 2 | 5 | 10 | 20 | 50 |
| 4 aces | 1,000 | 2,000 | 5,000 | 10,000 | 20,000 | 50,000 |
| 3 aces | 100 | 200 | 500 | 1,000 | 2,000 | 5,000 |
| 4 identical symbols | 200 | 400 | 1,000 | 2,000 | 4,000 | 10,000 |
| 3 identical symbols | 10 | 20 | 50 | 100 | 200 | 500 |
| . . . | ... | ... | | | ... | ... |

For other intermission values, the equation may be: Prize=Prize (Reference) * Intermission, wherein Intermission may be expressed in 1/100th of a second, for example.

In the exemplary table 2 above, the prize reference is set for 1 second. Consequently, in case of a win with 3 aces and an intermission of 2.73 seconds, the prize money is $100 * 2.73=273.00.

In a preferred embodiment of the present invention, a facility may be provided to enable the player to play games in a synchronized fashion in which games are automatically triggered by some form of psychedelic or ambiance input such as music tempo, microphone input tempo and video tempo. The games are automatically triggered following a manual arming activated by the player.

Figure 9:
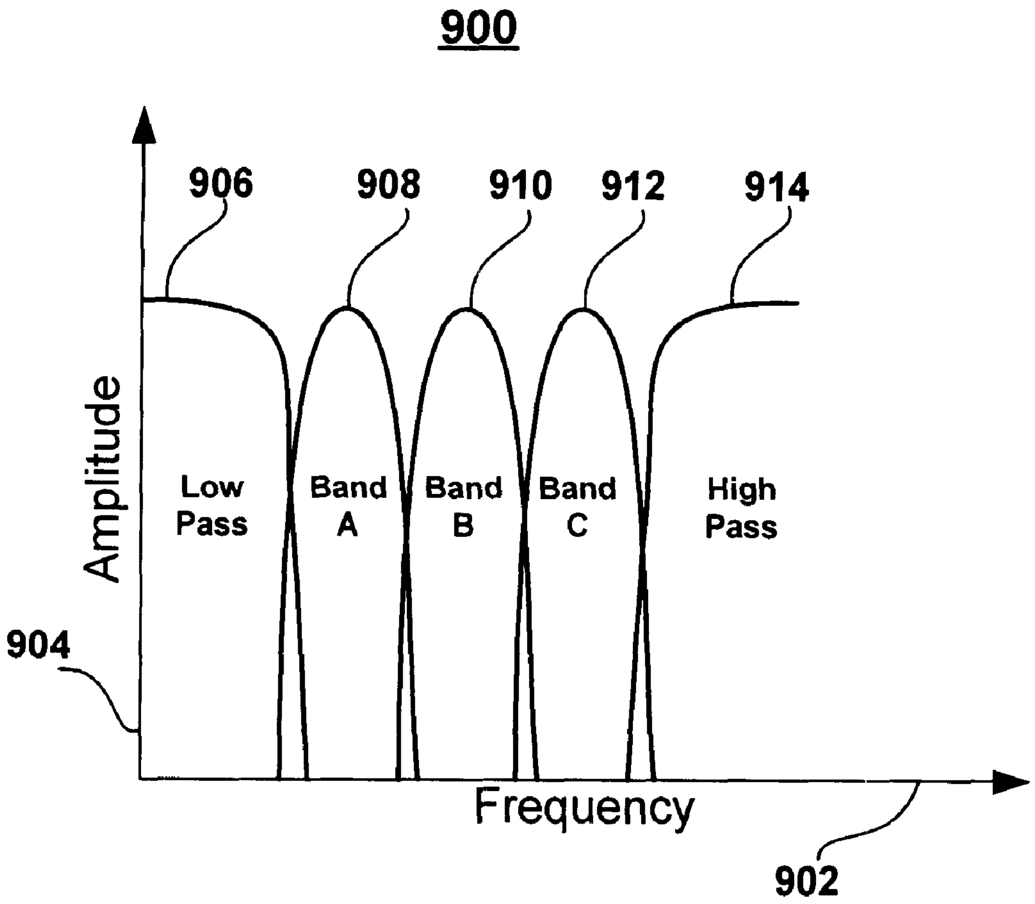
FIG. 9 is a diagram depicting audio frequency filters in accordance with an embodiment of the present invention.

FIG. 9 illustrates a typical set of sound frequency filters plotted on a frequency axis 902 versus an amplitude axis 904 for driving the psychedelic lights commonly found in disco-dancing places whereby multicolored spotlights are modulated by the music played. Spotlights of a given color are associated with a given filter band to achieve a desired illumination rhythm. For example, purple colored spotlights may be associated with the low pass filter 906, green colored spotlights may be associated with the high pass filter 914, yellow colored spotlights may be associated with the A pass-band filter 908, blue colored spotlights may be associated with the B pass-band filter 910 and red colored spotlights may be associated with the C pass-band filter 912.

Frequency filters may be implemented using analog electronic circuits and digital electronic circuits. Alternatively, the signal to filter may be digitized then mathematic functions may be applied in software in order to obtain the desired filtering to modulate or trigger a given device such as a spotlight, an alarm, and an event.

The output of a selected filter applied to music, speech, surrounding sound, surrounding light, or video images may be used as an external triggering event to start a game. An adjustable level thresholding control button may be used for triggering for example. A manual arming by the player may be advantageously provided prior to the triggering by an external event.

Figure 10:
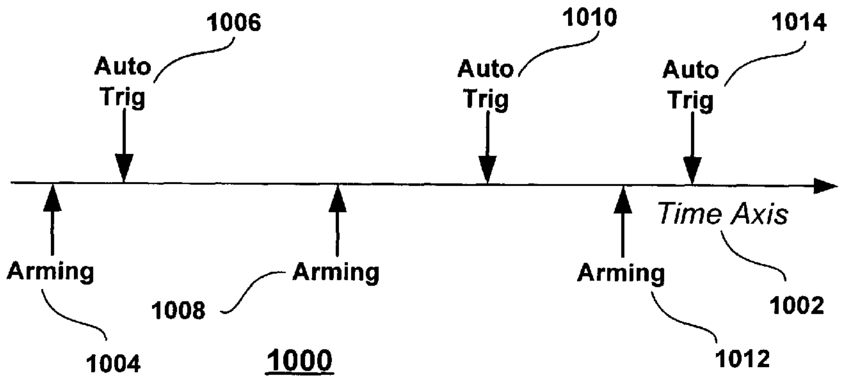
FIG. 10 is a diagram that depicts manual arming by the patron followed by one auto trigger in accordance with an embodiment of the present invention.

FIG. 10 illustrates on a time axis 1002 the manual arming 1004 activated by the player. An auto triggering 1006 signal driven by the filtered external event may occur at any time subsequent to arming. The triggering signal starts the game. For another game to be played, the player may arm again 1008, and then an auto trigger occurs moments later. This scenario may be repeated continuously whereby an auto trigger occurs moments later after a manual arming by the player and whereby the triggering is driven by an external event, until the credit of time is exhausted or the cash-out event is activated. In scenario 1000, only one trigger can occur after each arming. The intermission to compute the wager amount is the time elapsed between triggering events.

Figure 11:
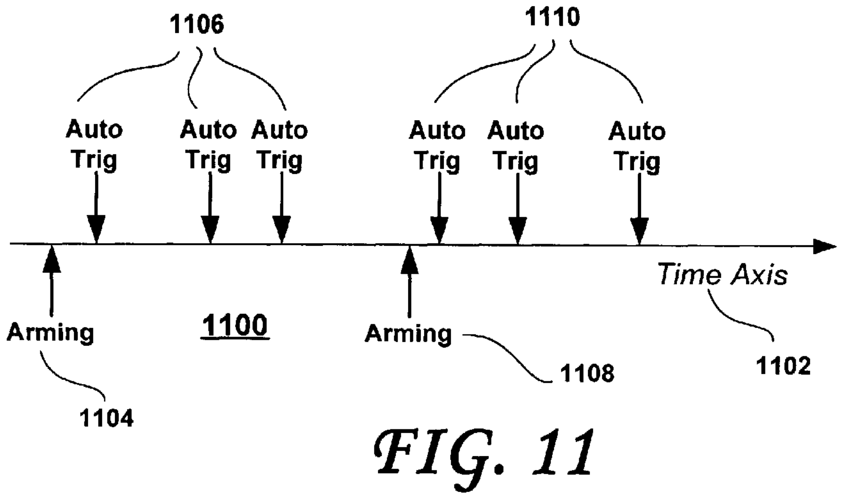
FIG. 11 is a diagram that depicts manual arming by the patron followed by three auto triggers in accordance with an embodiment of the present invention.

FIG. 11 illustrates another scenario wherein three (3) automatic triggers 1106, 1110 may occur after each manual arming 1104 and 1108 respectively initiated by the player. The choice for the number of triggers occurring automatically after an arming as well as the external triggering source may be selectable by the player. The intermission to compute the wager amount is the time elapsed between triggering events; the instant when the arming occurs is ignored.

Figure 12:
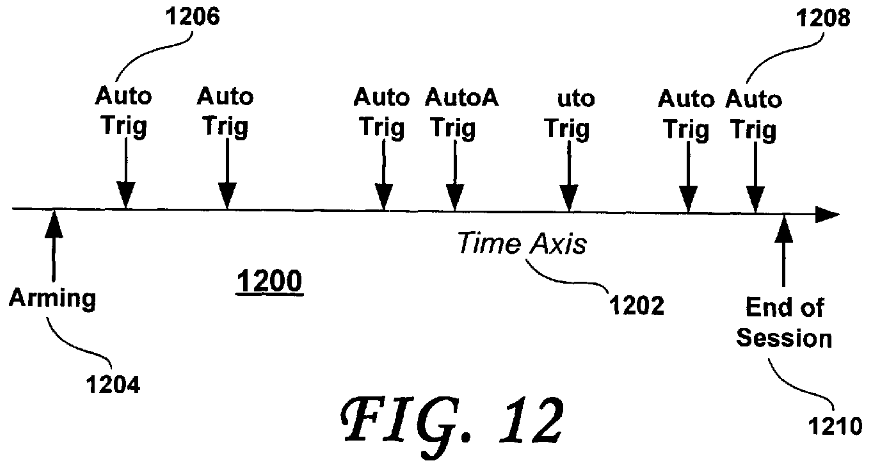
FIG. 12 is a diagram that depicts manual arming by the patron followed by continuous auto triggers in accordance with an embodiment of the present invention.

FIG. 12 illustrates a scenario wherein continuous automatic triggers 1206 to 1208 may occur after an initial manual arming 1204 performed by the player. The triggers occur automatically and continuously driven by the external triggering source selected by the player. The parameters of the triggering source may be varied by the player in order to obtain a desired triggering tempo. The intermission to compute the wager amount is the time elapsed between triggering events.

It is apparent to those of skill in the art that the invention described herein may be easily be modified to offer the player the ability to drive the automatic triggering from an entertainment source such as music and/or video streamed on the gaming terminal, or alternatively an arcade game played on the gaming terminal. Filtering of the signal source in order to get the desired triggering tempo may be performed using mathematical algorithms implemented in software whose parameters can be selected by the player via a suitable user interface.

CONCLUSIONS

The present invention offers a personalized and self-adjusting play pace that improves on the monotonousness of the prior art. The invention offers a more interesting play pace for patrons who may choose a play rhythm that is synchronized with their mood or alternatively with the entertainment that they are watching. The purchase of playing time combined with the enjoyment of some entertainment materials may offer a different way for game operators to market gaming terminal products to non-traditional gaming customers such as those traveling on cruise ships or those coming to Las Vegas for exhibitions.

We claim:

1. A method for enabling a patron to play a game that includes a wager on a gaming machine, comprising the steps of:

activating a game session on the gaming machine with a credit of playing time, the game session lasting an amount of time determined by the credit of playing time;

enabling successive games to be triggered during the game session at a pace;

determining an amount of the wager for each game played during the game session as a function of an elapsed time since a triggering of a previous game played during the game session.

2. The method of claim 1, wherein the credit of playing time is controlled by a down-counting timer and wherein the method further includes ending the game session when the down-counting timer reaches a predetermined number.

3. The method of claim 2, wherein the predetermined number is zero.

4. The method of claim 1, wherein the credit of playing time is controlled by an up-counting timer and wherein the method further includes ending the game session when the up-counting timer reaches a predetermined number.

5. The method of claim 1, wherein a prize outcome for a winning game is a function of the amount of the wager.

6. The method of claim 1, wherein a prize outcome for a winning game is a function of the time elapsed since the triggering of the previous game.

7. The method of claim 1, further comprising crediting winnings of the patron on a separate meter.

8. The method of claim 1, wherein the game session terminates when the credit of playing time is exhausted.

9. The method of claim 1, wherein the game session terminates when the credit of playing time reaches a predetermined value.

10. The method of claim 1, wherein the wager amount for a first game following activation of the game session is a predetermined amount.

11. The method of claim 1, wherein any remaining credit of playing time is frozen when the patron actuates a cash-out event.

12. The method of claim 11, further comprising, following actuation of the cash-out event, a step of resuming the game session using the remaining credit of playing time.

13. The method of claim 1, further comprising an initial step of dispensing to the patron an ID instrument associated with the amount of playing time purchased by the patron, the ID instrument being submitted to the gaming machine to activate the game session.

14. The method of claim 1, wherein a plurality of gaming machines are provided and wherein the activating and enabling steps are carried out on any one of the plurality of gaming machines.

15. The method of claim 1, wherein a plurality of gaming machines are provided and wherein the activating, enabling and determining steps are carried out on any one of the plurality of gaming machines.

16. The method of claim 1, wherein the successive games are triggered by the patron.

17. The method of claim 1, wherein the pace at which the successive games are triggered is variable.

18. A method for a patron to wager on gaming machines, comprising the step of:

activating a game session at a gaming machine with a credit of playing time, the game session lasting an amount of time determined by the credit of playing time;

triggering each game by an external event selected by the patron;

determining a wager amount debited for each game as a function of a time elapsed since a triggering of a previous game during the game session.

19. The method of claim 18, wherein the step of triggering each game is preceded by a manual arming step done by the patron.

20. The method of claim 18, wherein the external event selected by the patron is selected from a processed signal corresponding to at least one of:

a sound detected by a microphone coupled to or integrated in the gaming machine;

an image captured by a video camera coupled to or integrated in the gaming machine;

music, sound or speech streamed on the gaming machine;

movie or video content streamed on the gaming machine, and the game played on the gaming machine.

21. The method of claim 20, further comprising the step of enabling the patron to select a triggering scheme of the processed signal selected from at least one of:

a level threshold;

a frequency band;

a level threshold in a frequency band, and a result of applying the processed signal to a mathematical function.

22. The method of claim 18, wherein the credit of playing time is controlled by a down-counting timer and wherein the method further includes ending the game session when the down-counting timer reaches a predetermined value.

23. The method of claim 22, wherein the predetermined value is zero.

24. The method of claim 18, wherein the credit of playing time is managed by an up-counting timer and wherein the method further includes ending the game session when the up-counting timer reaches a predetermined value.

25. The method of claim 18, wherein a prize outcome for winnings is a function of the wager amount.

26. The method of claim 18, wherein a prize outcome for winnings is a function of a time elapsed since the previous game during the game session.

27. The method of claim 18, further comprising crediting winnings of the patron on a separate meter.

28. The method of claim 18, wherein the game session terminates when the credit of playing time is exhausted.

29. The method of claim 18, wherein the game session terminates when the credit of playing time reaches a predetermined level.

30. The method of claim 18, wherein the wager amount for a first game following activation of the game session is a predetermined amount.

31. The method of claim 18, wherein any remaining credit of playing time is frozen when the patron actuates the cash-out event.

32. The method of claim 31, further comprising, following actuation of the cash-out event, a step of resuming the game session using the remaining credit of playing time.

33. The method of claim 18, further comprising an initial step of dispensing to the patron an ID instrument associated with the amount of playing time purchased by the patron, the ID instrument being submitted to the gaming machine to activate the game session.

34. A system for controlling gaming sessions to enable a patron to play wager games for a predetermined amount of time, comprising:

at least one gaming machine;

a timer associated with each game session, the timer having a predetermined clock interval;

means to pre-set the timer to a predetermined value and to start the timer;

means to trigger the start of a game;

means to measure a time elapsed since a last game played, and processing means to adjust a wager amount as a function of a time elapsed since the last game.

35. The system of claim 34, further including means for ending the game session when the timer reaches a predetermined value.

36. The system of claim 35, wherein the predetermined value is zero.

37. The system of claim 34, further comprising processing means to adjust prizes outcome as a function of the wager amount.

38. The system of claim 34, further comprising processing means to adjust prizes outcome as a function of a time elapsed since the last game.

39. The system of claim 34, further comprising:

a communication network;

at least one gaming machine coupled to the communication network;

a central system coupled to the communication network, the down-counting timer associated with each game session being located at the central system.

40. The system of claim 34, further comprising:

a communication network;

at least one gaming machine coupled to the communication network;

a central system coupled to the communication network, the central system comprising means for metering winnings associated with each game session.

41. The system of claim 34, further comprising means to stop the timer.

42. The system of claim 34, further comprising:

means to activate a cash-out event that halts the game session;

means to resume the game session.

43. The system of claim 42, wherein the cash-out activating means includes means for freezing the timer upon the occurrence of the cash-out event.

44. The system of claim 34 wherein the timer is a down-counting timer.

45. The system of claim 34, wherein the timer is an up-counting timer.

46. The system of claim 34, further comprising:

peer-to-peer computer means to enable each of the at least one gaming machines to transfer, upon request from a requesting one of the at least one gaming machines, a frozen timer associated with a gaming session of a gaming machine on which the cash-out event has been activated to the requesting gaming machine, thereby allowing the patron resumes the game session on the requesting gaming machine.

47. The system of claim 34, wherein the timer associated with each game session is mirrored on at least one other gaming machine.

* * * * *